(12) United States Patent
Hinz et al.

(10) Patent No.: US 6,410,801 B1
(45) Date of Patent: Jun. 25, 2002

(54) CONTINUOUS PROCESS FOR THE PRODUCTION OF POLYETHER POLYOLS

(75) Inventors: Werner Hinz; Edward Michael Dexheimer, both of Grosse Ile, MI (US)

(73) Assignee: BASF Corporation, Mt. Olive, NJ (US)

(*) Notice: Subject to any disclaimer, the term of this patent is extended or adjusted under 35 U.S.C. 154(b) by 0 days.

(21) Appl. No.: 09/442,882

(22) Filed: Nov. 18, 1999

(51) Int. Cl.$^7$ ............................................... C07C 43/20
(52) U.S. Cl. ....................... 568/606; 568/607; 568/611; 568/613; 568/618; 568/619
(58) Field of Search ................................ 568/607, 611, 568/613, 606, 618, 619

(56) References Cited

U.S. PATENT DOCUMENTS

| | | | |
|---|---|---|---|
| 2,988,572 A | 6/1961 | Mills et al. .................. | 260/615 |
| 3,346,557 A | 10/1967 | Patton et al. ............... | 260/209 |
| 3,436,425 A | 4/1969 | Stein et al. ................. | 260/613 |
| 3,436,426 A | 4/1969 | Fischer et al. .............. | 260/613 |
| 3,530,154 A | 9/1970 | Stein et al. ............... | 260/410.6 |
| 3,894,093 A | 7/1975 | Raizner et al. .......... | 260/613.8 |
| 4,241,043 A | 12/1980 | Hetzel ........................ | 423/659 |
| 4,380,502 A | 4/1983 | Müller et al. ............... | 252/182 |
| 4,396,780 A | 8/1983 | Shtykh et al. .............. | 568/620 |
| 5,689,012 A | 11/1997 | Pazos et al. ................ | 568/619 |
| 5,811,595 A | 9/1998 | Ellis ........................... | 568/620 |
| 5,843,386 A | 12/1998 | Makino et al. ............. | 422/203 |
| 6,066,263 A | 5/2000 | Makino et al. ............. | 210/774 |

FOREIGN PATENT DOCUMENTS

| | | | |
|---|---|---|---|
| CA | 544626 | 8/1957 | |
| CA | 652512 | 11/1962 | ................ 260/611 |
| DE | 2903582 A2 | 8/1980 | |
| DE | 19615974 A1 | 10/1996 | |
| GB | 736991 | 9/1955 | ........................ 2/3 |
| GB | 757309 | 9/1956 | ........................ 2/5 |
| GB | 1-470-864 | * 4/1977 | |
| GB | 2043663 | 10/1980 | ........... C08G/65/28 |
| JP | H6-16806 | 1/1994 | ........... C08G/65/28 |
| JP | H441996559 | 1/1994 | ........... C08G/65/28 |

OTHER PUBLICATIONS

Article—"Towards a Continuous Process in Heterogeneous Coordinated Anionic Ring Opening Polymerization"—Polymer Bulletin; vo. 37, No. 3, pp. 313–320 (Jun. 7, 1996).
Process Economics Report No. 45A—"Polyols for Polyurethanes" (May 1982) pp i–xvi; 1–13; and 41–64.
PCT International Search Report Dated Oct. 30, 2000. Chem Abstract of DE 2903582–A2.
PCT International Search Report, 4 Pages.

* cited by examiner

*Primary Examiner*—Rosalynd Keys
(74) *Attorney, Agent, or Firm*—Mark K. Cameron

(57) ABSTRACT

A continuous alkoxylation process for the production of polyether polyols is disclosed. The process comprises the use of a plurality of reaction modules each having an outer tube and an inner tube with annular chamber between them. A spiral reaction tube is spaced from the inner tube and winds around the inner tube within the annular chamber. The spiral reaction tube includes an inlet and an outlet, each of which extend through said outer tube. A heat exchange medium flows through the annular chamber and controls the reaction temperature in the spiral reaction tube. The process comprises continuously forming an initial reaction mixture of at least one alkylene oxide and an initiator having at least one reactive hydrogen which is reactive to the alkylene oxide. Continuously flowing the initial reaction mixture through a first spiral reaction tube having an internal diameter and a spiral diameter that promote a pseudo-turbulent flow of the initial reaction mixture through the first spiral reaction tube to form a reaction product. Then flowing the reaction product into a second spiral reaction tube and adding a catalyst and an alkylene oxide to the reaction product, the second spiral reaction tube having an internal diameter and a spiral diameter that promote a pseudo-turbulent flow of the reaction product, the catalyst and the alkylene oxide in the second spiral reaction tube.

12 Claims, 4 Drawing Sheets

CONTINUOUS PROCESS FOR THE PRODUCTION OF POLYETHER POLYOLS

BACKGROUND OF THE INVENTION

This invention relates generally to a method for producing polyether polyols and, more particularly, to a continuous process for the production of polyether polyols.

Polyols are generally defined as compounds that include a plurality of hydroxyl groups. They can be simple polyols or as complex as a 10,000 Dalton polyether polyol comprising a heteric mixture of ethylene oxide and propylene oxide. Polyols, particularly polyether polyols, are useful when combined with isocyanates to form polyurethanes. To produce a high quality polyurethane it is necessary to begin with a high quality polyol. By high quality it is meant a polyol that has a very narrow size distribution and a generally uniform composition. Typically polyols are produced commercially in a batch reactor. A batch reactor is a large reactor chamber that includes and agitator and a thermal jacket. The reactants are added in bulk to the reactor under pressure and the reaction proceeds for hours and sometimes days. One problem with batch reactors is that thermal control can be hard to achieve and the entire reaction must be run at a common temperature. Also the batch reactor needs to be shut down to remove the reaction product, thus slowing production.

It would be advantageous to design a continuous reactor assembly to permit the continuous formation of high quality polyether polyols. It would be most advantageous to design the reactor assembly in a manner that promotes turbulent or pseudo-turbulent flow of the reactants and that is modular to permit rapid and easy modification of the assembly to meet the design requirements of a variety of polyols. It would be additionally beneficial to design the reactor assembly to permit different reaction temperatures at different points in the reaction.

SUMMARY OF THE INVENTION

In general terms, this invention provides a continuous reactor assembly and a method of using the same to form polyether polyols. The reactor assembly is of a modular design that permits rapid and easy modification of the reactor to accommodate different reaction requirements imposed by the chosen product. The reactor assembly additionally provides the ability to prepare a polyol that requires different reaction temperatures at different points in the reaction.

In a first embodiment the method of the present invention comprises a continuous process of forming polyether polyols comprising the steps of: continuously forming an initial reaction mixture of at least one alkylene oxide and an initiator having at least one reactive hydrogen which is reactive to the alkylene oxide; continuously flowing the initial reaction mixture through a first spiral reaction tube having an internal diameter and a spiral diameter that promote a pseudo-turbulent flow of the initial reaction mixture through the first spiral reaction tube to form a reaction product; flowing the reaction product into a second spiral reaction tube operably connected to the first spiral reaction tube and adding a catalyst and an alkylene oxide to the reaction product, the second spiral reaction tube having an internal diameter and a spiral diameter that promote a pseudo-turbulent flow of the reaction product, the catalyst and the alkylene oxide in the second spiral reaction tube; and continuously flowing a heat exchange medium around said first and said second spiral reaction tubes, said heat exchange medium establishing and maintaining a reaction temperature between 130° C. and 250° C. in said first and said second spiral reaction tubes.

Another embodiment of the method of the present invention comprises a continuous process of forming polyether polyols comprising the steps of: continuously forming an initial reaction mixture of ethylene oxide and an aromatic initiator in the absence of a catalyst, the aromatic initiator having at least one reactive hydrogen which is reactive to the ethylene oxide; continuously flowing the initial reaction mixture through a first spiral reaction tube having an internal diameter and a spiral diameter that promote a pseudo-turbulent flow of the initial reaction mixture through the first spiral reaction tube to form a reaction product; flowing the reaction product into a second spiral reaction tube operably connected to said first spiral reaction tube and adding a catalyst and an alkylene oxide to the reaction product, the second spiral tube having an internal diameter and a spiral diameter that promote a pseudo-turbulent flow of the reaction product, the catalyst and the alkylene oxide in the second spiral tube; surrounding the first and the second spiral reaction tube with a heat exchange medium, the heat exchange medium establishing and maintaining a reaction temperature between 130° C. and 250° C. in the first and the second spiral reaction tubes; and pressurizing the first and the second spiral reaction tube at a pressure between 200 to 1500 pounds per square inch, thereby maintaining the ethylene oxide and the alkylene oxide in a liquid state.

These and other features and advantages of this invention will become more apparent to those skilled in the art from the following detailed description of the presently preferred embodiment. The drawings that accompany the detailed description can be described as follows.

DETAILED DESCRIPTION OF A PREFERRED EMBODIMENT

Figure 1:
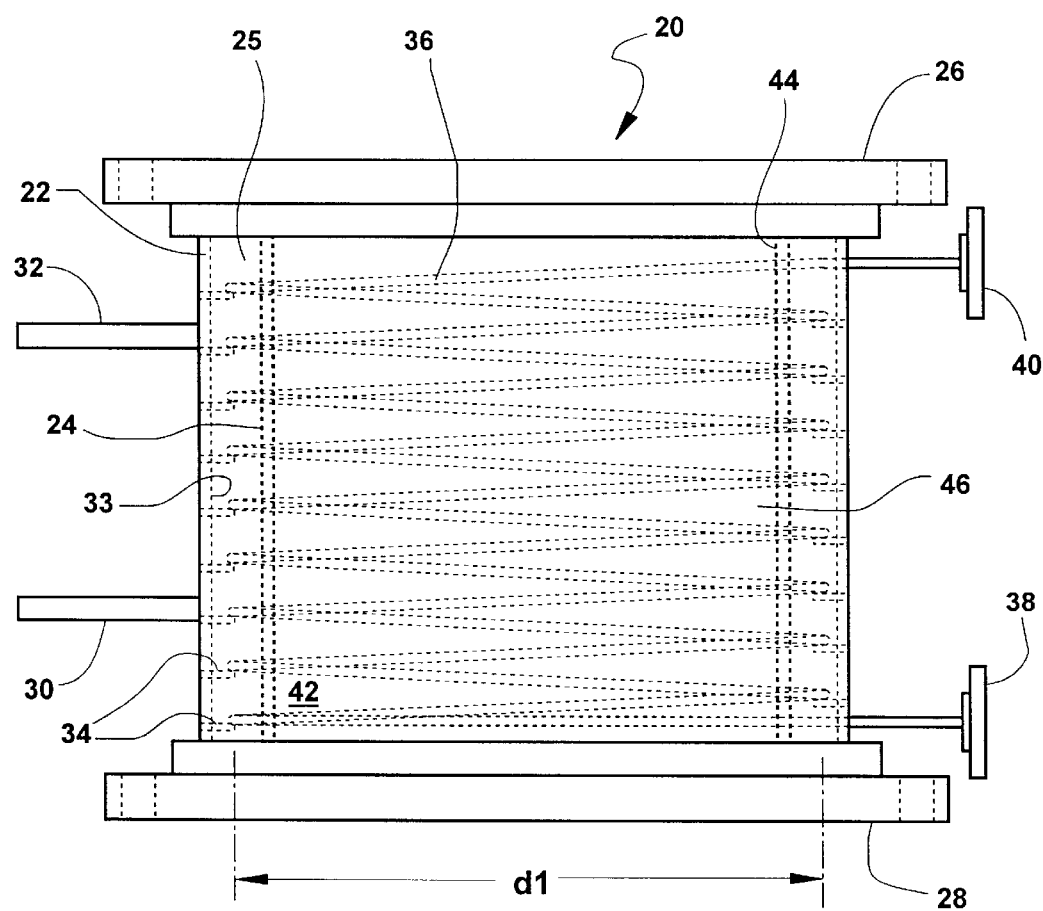
FIG. 1 is a sectional view of a reaction module.

Within the several views described below like components are given the same reference numerals.

A reactor module is generally indicated at 20 in FIG. 1. Reactor module 20 comprises an outer tube 22 which defines an annular chamber 25. In a preferred embodiment, the module 20 further includes an inner tube 24, with the annular chamber 25 defined between the inner tube 22 and the outer tube 24. Reactor module 20 further includes an upper flange 26 opposite a lower flange 28. A heat exchange medium inlet 30 extends through the outer tube 22 into the annular chamber 25 and a heat exchange medium outlet 32 also extends through the outer tube 22 into the annular chamber 25. In one embodiment, support rods 34 are secured to an inner wall 33 of the outer tube 22 and extend toward the inner tube 24. Alternatively, the support rods 34 may be secured to inner tube 24 and extend toward outer tube 22.

A spiral reaction tube 36 is spaced apart from and spirals around the inner tube 24. Spiral reaction tube 36 rests on support rods 34 in the annular chamber 25. Spiral reaction tube 36 has a spiral diameter d1 that is preferably approximately 1 to 2 inches less than the inner diameter of outer tube 22. Thus, spiral reaction tube 36 closely follows the inner contour of outer tube 22 which can be varied between about two feet and ten feet in diameter. The spiral reaction tube 36 is preferably formed from stainless steel, but as is apparent to one of ordinary skill in the art, tube 36 could be formed of other materials so long as it is compatible with the desired reaction as described below. The internal diameter of the spiral reaction tube 36 can vary between about 0.25 to 3.0 inches depending on the operating parameters, as more fully described below. The length of the spiral reactor tube 36 can vary between about 20 feet and several hundred feet depending on the requirements of the reaction. Preferably, the length and diameter of spiral reaction tube 36 are chosen to ensure that any reactants introduced at an inlet 38 have a sufficient residence time to permit a substantially complete reaction between the reactants before the product of the reactants reaches an outlet 40. Furthermore the internal diameter and the spiral diameter d1 of the spiral reaction tube 36 are specifically designed to ensure a largely turbulent or pseudo-turbulent flow, defined as a flow with eddy current mixing off a continuously curved wall, of reactants through the spiral reaction tube 36. This turbulent flow greatly increases the efficiency of the reaction, especially for polyether polyol formation. As described below, the velocity of the flow rate of reactants in the spiral reaction tube 36 is also preferably chosen to provide turbulent flow. The spiral reaction tube 36 inlet 38 and outlet 40, both extend beyond the outer tube 22. Both the inlet 38 and the outlet 40 include connectors (not shown) that permit feed lines (see FIGS. 2 and 3) to be connected to each.

Figure 2:
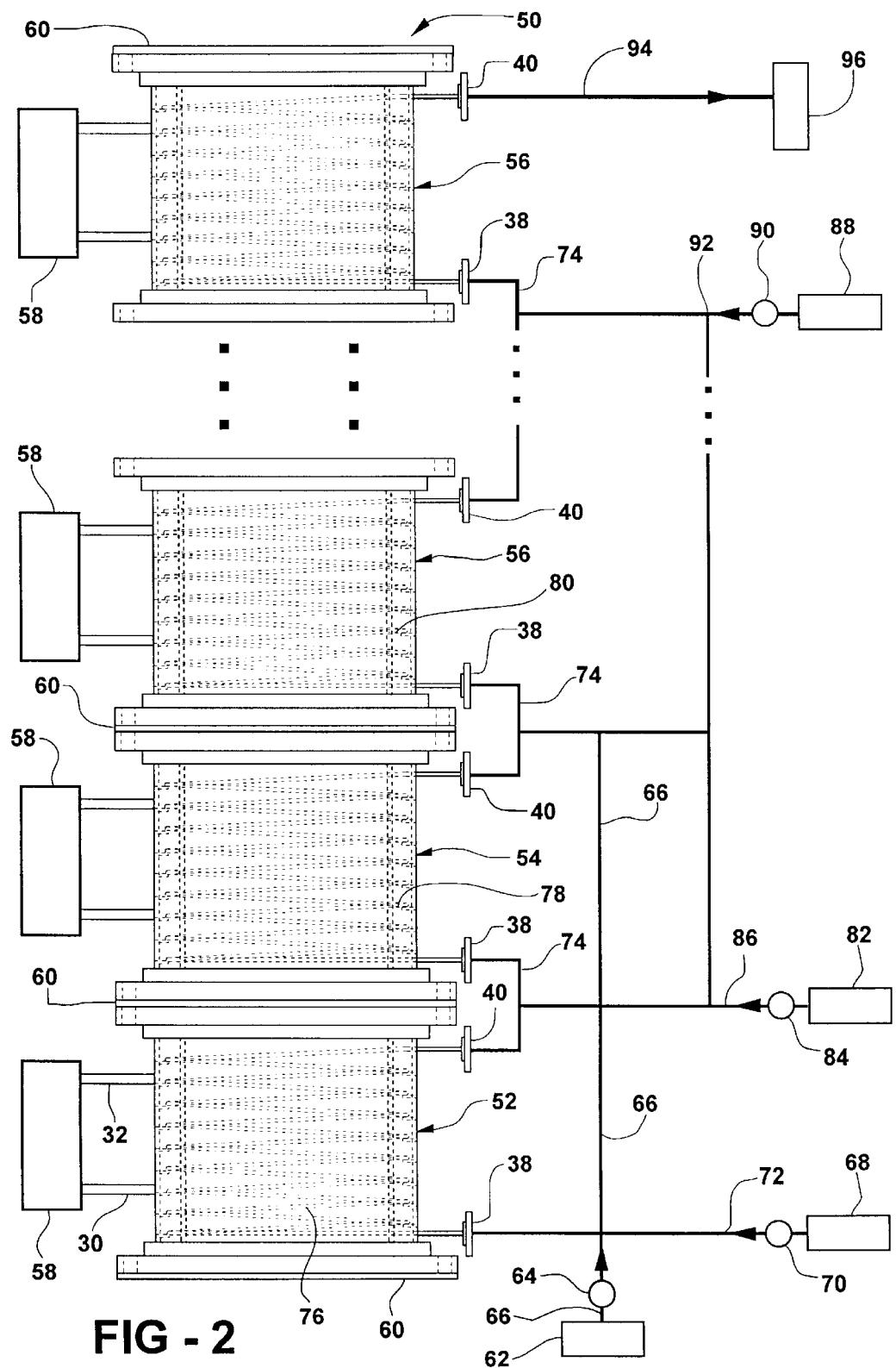
FIG. 2 is a schematic view of a first embodiment of a continuous reactor.
Figure 3:
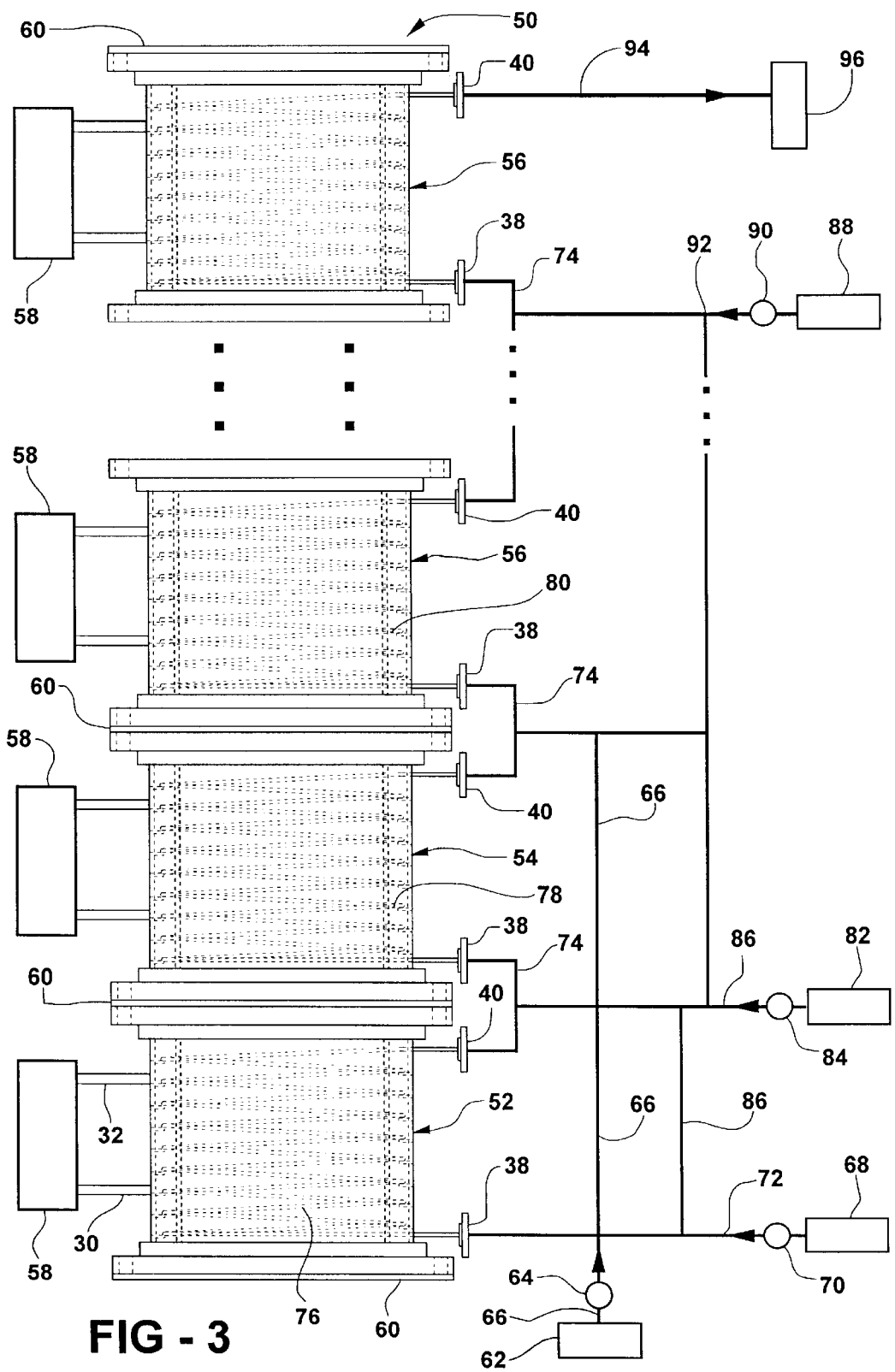
FIG. 3 is a schematic view of another embodiment of a continuous reactor.

Adjacent the upper flange 26 and the lower flange 28 is a seal 60 (see FIGS. 2 and 3) that seals the annular chamber 25 and a space 42 defined by an inner wall 44 of the inner tube 24. In a preferred embodiment, the inner tube 24 includes perforations (not shown) that permit fluid communication between the annular chamber 25 and space 42. A heat exchange medium 46 continuously flows from heat exchange medium inlet 30 through annular chamber 25 and out of heat exchange medium outlet 32 and then recirculates through a heat exchanger 58 (FIGS. 2 and 3). The flow of the heat exchange medium 46 is preferably turbulent within the annular chamber 25. The heat exchange medium 46 may also flow through space 42, which can serve as a large heat sink to maintain a reaction temperature within the spiral reaction tube 36.

A schematic of a continuous reactor assembly is shown generally at 50 in FIGS. 2 and 3. Continuous reactor assembly 50 comprises a series of modules including a first module 52, a second module 54, and additional modules 56 stacked on top of each other and connected via fasteners (not shown) on their respective upper and lower flanges. Such fasteners are known in the art. The first module 52 includes a first spiral reaction tube 76, the second module 54 includes a second spiral reaction tube 78, and the additional modules 56 each include an additional spiral reaction tube 80. The spiral reaction tubes 76, 78, and 80 are operably connected in series via connector lines 74. By virtue of these connections a fluid flow is established from the inlet 38 of the first spiral reaction tube 76 through the outlet 40 of the last additional spiral reaction tube 80. Preferably the internal diameter of the first and second spiral reaction tubes 76 and 78 are about 0.75 inches. Preferably the spiral reaction tubes in subsequent modules have an internal diameter that is larger, on the order of between 1.5 to 3.0 inches. The larger diameter is necessary to accommodate the increased viscosity of the reaction product as the polyol chain grows and the increased volume of the reaction product while maintaining the turbulent flow characteristics.

Each module 52, 54 and 56 includes a heat exchanger connected to its heat exchange medium inlet 30 and heat exchange medium outlet 32. This design permits each module 52, 54, and 56 to have a different reaction temperature. For example, it is advantageous when adding propylene oxide as the alkylene oxide to have a higher reaction temperature, preferably 180° C. to 250° C., than when ethylene oxide is the alkylene oxide being added. As would be understood by one of ordinary skill in the art, one or more modules could share a common heat exchanger 58. Because of the continuous flow of the heat exchange medium, the temperature differential between the heat exchange medium and the reaction temperature is small. Said another way, the heat exchange medium is generally heated to the desired reaction temperature in a given module 20.

Continuous reactor assembly 50 further includes a stock alkylene oxide tank 62 that is operably connected to the inlet 38 of the first spiral reaction tube 76 through a feed line 66. A pump 64 connected to feed line 66 pressurizes the alkylene oxide in feed line 66 to a pressure of between about 200 to 1500 pounds per square inch. The actual pressure is chosen to be above the vapor pressure of the alkylene oxide to thus maintain the alkylene oxide in a liquid state throughout the continuous reactor assembly 50. A stock initiator tank 68 is operably connected to the inlet 38 of the first spiral reactor tube 76 through a feed line 72. A pump 70 connected to feed line 72 pressurizes the initiator in feed line 72 to a pressure of between about 200 to 1500 pounds per square inch. The alkylene oxide and initiator react to form an initial reaction mixture in first spiral reaction tube 76 and to form a reaction product as the initial reaction mixture exits the outlet of the first spiral reaction tube 76. A stock catalyst tank 82 is operably connected to the inlet 38 of the second spiral reactor tube 78 through a feed line 86 which connects to connector line 74. A pump 84 connected to feed line 86 pressurizes the catalyst in feed line 86 to a pressure of between about 200 to 1500 pounds per square inch. Both stock alkylene oxide tank 62 and stock catalyst tank 82 are operably connected to the inlet of second spiral reaction tube 78 and additionally operably connected to additional inlets of additional spiral reaction tubes 80 beyond second spiral reaction tube 78. Thus catalyst and alkylene oxide can be added to the reaction product of the first spiral reaction tube 76 at multiple points in the continuous reactor assembly 50. Another alkylene oxide tank 88 is operably connected to the inlet 38 of one or more of the additional spiral reactor tubes 80 through a feed line 92 which connects to connector line 74 joining additional spiral reactor tubes 80. A pump 90 connected to feed line 92 pressurizes the other alkylene oxide in feed line 92 to a pressure of between about 200 to 1500 pounds per square inch to maintain the other alkylene oxide in a liquid state. As will be understood by one of ordinary skill in the art, in some reactions it may be advantageous if pumps 64, 70, 84, and 90 are operated at lower pressures so long as the pressure is above the pressure in an associated spiral reaction tube 36 so that the reactants flow into the continuous reactor 50.

The outlet of the last module is operably connected through a feed line 94 to a storage tank 96. The product leaving the final module can then be further processed to produce the final product, for example, a polyether polyol. In the continuous reactor assembly 50 shown in FIG. 2 the catalyst is not added until after the alkylene oxide first reacts with the initiator. This can be beneficial when it is desired to ensure that all of the reactive hydrogens on the initiator are replaced with the alkylene oxide prior to adding catalyst and beginning to build the polyol chain. As shown in FIG. 3, other polyol formation reactions are best performed by adding initiator, alkylene oxide and catalyst to the first spiral reaction tube 76, thus in FIG. 3 the feed line 86 is additionally operably connected to the inlet of the first spiral reaction tube 76. This is the only difference between the continuous reactor assembly 50 shown in FIGS. 2 and 3.

Figure 4:
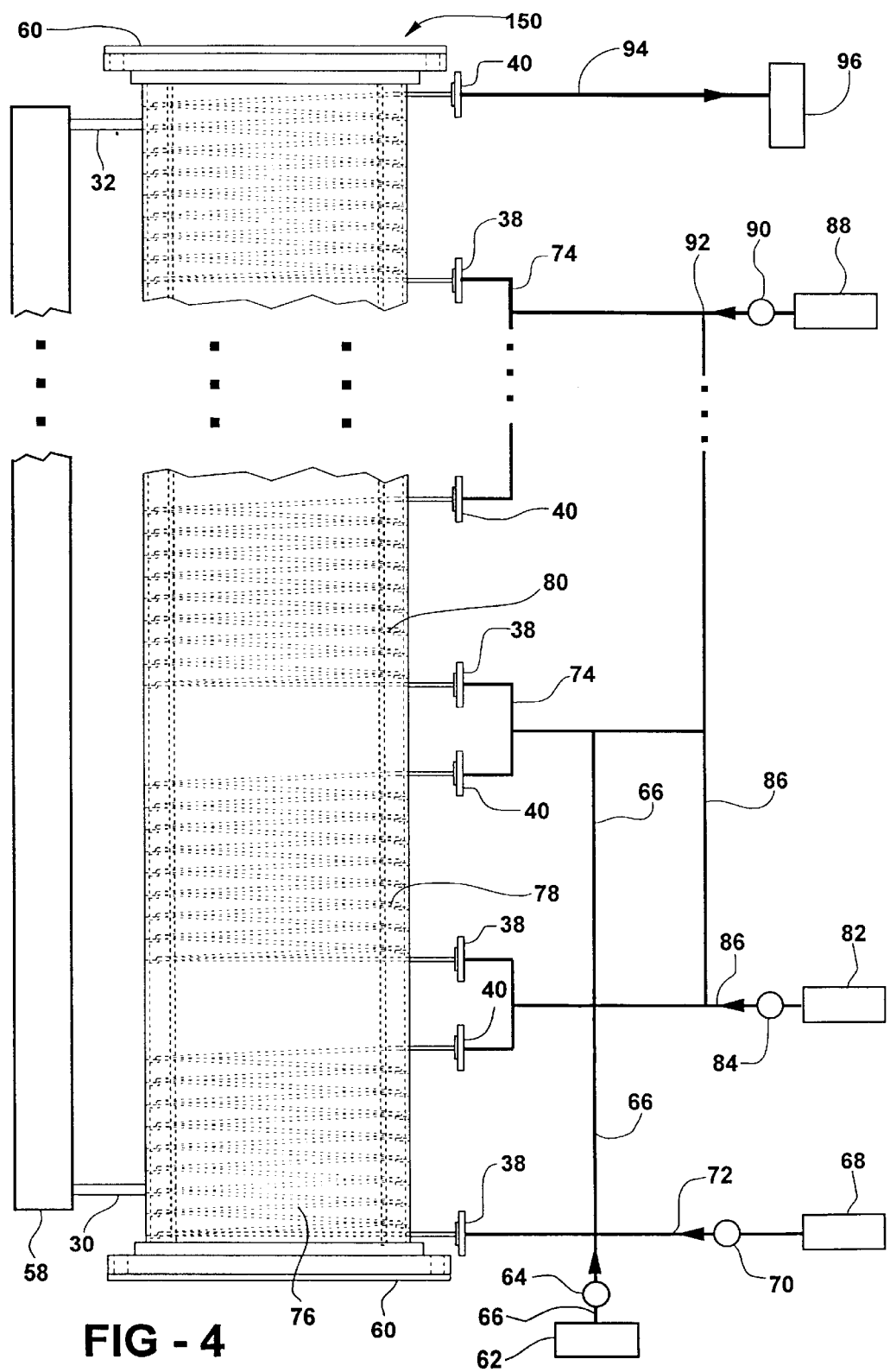
FIG. 4 is an alternative embodiment of the continuous reactor shown in FIG. 2.

In FIG. 4 an alternative embodiment of the reactor assembly of FIG. 2 is shown at 150. The only difference in reactor assembly 150 is that it is formed as a single module 20 having a plurality of spiral reaction tubes 36 operably connected to each other in series including the first spiral reaction tube 76, second spiral reaction tube 78 and additional spiral reaction tubes 80. In addition, a single heat exchange medium inlet 30 and outlet 32 recirculates a heat exchange medium through a single heat exchanger 58 to provide a uniform temperature in the continuous reactor assembly 150.

Now that the structure of the continuous reactor assembly 50 has been described, its use to form several example polyether polyols will be described. The continuous reactor assembly 50 shown in FIG. 2 was used to form a polyether polyol wherein the first alkylene oxide was ethylene oxide and the initiator was an aromatic initiator having reactive hydrogens that are reactive to ethylene oxide. One example of such an initiator is toluene diamine. When self catalyzing initiators such as amines, like toluene diamine, or acids such as phosphoric acid are used it is preferred that all of the reactive hydrogens are reacted with the first alkylene oxide prior to adding any additional catalyst. Also, it is preferred that the free alkylene oxide level not exceed 25 weight % based on the total weight of the alkylene oxide and initiator, thus it may be necessary to use multiple injections of alkylene oxide in multiple spiral reaction tubes 76 prior to adding catalyst. When using ethylene oxide as the alkylene oxide and toluene diamine it is preferred that 4 moles of ethylene oxide be added to each mole of toluene diamine prior to addition of catalyst. The ethylene oxide is fed into the inlet 38 of first spiral reaction tube 76 under a pressure of between 200 and 1500 pounds per square inch to maintain the ethylene oxide in a liquid state. The initial reaction mixture of ethylene oxide and toluene diamine self catalyzes and becomes a reaction product during flow through the first spiral reaction tube 76 to form a reaction product wherein ethylene oxide replaces the reactive hydrogens on the amines of toluene diamine. Preferably the stoichiometry of alkylene oxide to initiator is designed to produce a reaction product with very low concentrations of polymeric alkylene oxide. In subsequent modules, after complete reaction of the ethylene oxide with the reactive hydrogens on the toluene diamine, both ethylene oxide and catalyst are added to form an elongated polyether polyol through the well know chain extension reaction. The preferred catalysts are potassium hydroxide, sodium hydroxide, alcoholates of potassium hydroxide, alcoholates of sodium hydroxide, cesium hydroxide, amines, Lewis acid catalysts, or double metal complex catalysts, all of which are known in the art.

At additional points in the continuous reactor 50 another alkylene oxide such as propylene oxide can be added to the reaction product. Because of the length of the spiral reaction tubes any alkylene oxide added to any module is substantially completely reacted before the reaction product flows to the next spiral reaction tube. Thus, the process allows the formation of polyether polyols which are all of approximately the same length, thus reducing heterogeneity in the product. In addition, the design ensures that at any given time the amount of alkylene oxide in the reaction is low compared to a batch reactor and that the stoichiometry is better controlled. This also enhances the quality of the polyether polyol. The multiple addition points permit an operator to form a variety of polyols, for example, a polyether polyol having blocks of ethylene oxide and propylene oxide or a heteric polyol. As will be understood by one of ordinary skill in the art the separate heat exchangers 58 permit the reaction temperature to be changed during the reaction. This ability can be useful to increase the yield of the reaction and the reaction temperature will be determined in part by the identity of the alkylene oxide used in a given spiral reaction tube. The continuous reactor assembly shown in FIG. 3 will be used when it is not desirable to first replace all of the reactive hydrogens on the initiator with an alkylene oxide prior to beginning the elongation reaction. The reactor assembly 150 is more efficient when it is desired to run the entire reaction at a single reaction temperature.

Suitable alkylene oxides for use in the formation of polyether polyols include ethylene oxide, propylene oxide, and butylene oxide.

Suitable catalysts include: the alkaline catalysts such as potassium hydroxide, sodium hydroxide, alcoholates of potassium hydroxide, alcoholates of sodium hydroxide, cesium hydroxide, or amines; Lewis acid catalysts such as boron trifluoride; and metal complex catalysts such as double metal cyanide complexes. Preferably the catalyst is added in an amount of 0.1% to 1.0% in a given addition.

Suitable initiators include amines and aromatic initiators having hydrogens which are reactive with alkylene oxides. Preferred aromatic initiators include toluene diamine, hydroquinone, and other aromatic initiators. Other initiators include the well known non-aromatic initiators which have hydrogens that are reactive to alkylene oxides such as glycerol.

EXAMPLE 1

A continuous reactor similar to that disclosed in FIG. 2 was utilized in preparing the following example. Vicinal toluene diamine (a mixture of 2,3- and 3,4-toluene diamine) was loaded into stock initiator tank 68 and kept under nitrogen pressure. Ethylene oxide monomer was loaded into stock alkylene oxide tank 62 and also kept under nitrogen pressure (35 lbs. per square inch). Propylene oxide monomer was loaded into the other alkylene oxide tank 88 and also kept under nitrogen pressure. The vicinal toluene diamine was injected together with the ethylene oxide monomer into a first spiral reaction tube 76. The feed rate ratio of vicinal toluene diamine to ethylene oxide monomer was 7.3:8.6 (w/w). The pressure upon injection into the first spiral reaction tube 76 was 995 lbs. per square inch and the heat exchange medium was at a temperature of 160° C. The reaction product exiting the first spiral reaction tube was passed into a second spiral reaction tube 78 wherein the heat exchange medium was at a temperature of 210° C. Intermediate removed at this point in the reaction had a hydroxyl number of 758, and an amine number of 216, and a viscosity of 6,200 centipoise at 120° F. The intermediate from the second spiral reaction tube 78 was injected together with an aqueous KOH solution (45%) and propylene oxide monomer mixture from the other alkylene oxide tank 88 into a third spiral reaction tube 80. The feed ratio of intermediate to monomer mixture was 7.9:9.0 (w/w). The catalyst concentration of KOH was 0.2%. The heat exchange medium was at a temperature of 180° C. The reaction product from the third spiral reaction tube was passed through a fourth spiral reaction tube 80 wherein the heat exchange medium was at a temperature of 230° C. The product from the fourth spiral reaction tube was placed under high vacuum to remove unreacted alkylene oxide monomer. The obtained product had a hydroxyl number of 395, and an amine number of 103, and a viscosity of 6,600 centipoise at 80° F.

EXAMPLE 2

Example 2 was prepared similar to Example 1. Vicinal toluene diamine and ethylene oxide were fed into the first spiral reaction tube at a ratio of initiator to monomer of 7.3:9.0 (w/w). The pressure at the injection point was 660 lbs. per square inch and the heat exchange medium was at a temperature of 140° C. The product from the first spiral reaction tube was passed through a second spiral reaction tube wherein the heat exchange medium was at a temperature of 200° C. The intermediate from the second spiral reaction tube had a hydroxyl number of 749, and an amine number of 205, and a viscosity of 6,300 centipoise at 120° F. The intermediate from the second spiral reaction tube was injected together with an aqueous KOH solution (45%) and propylene oxide monomer mixture into a third spiral reaction tube. The feed ratio of intermediate to propylene oxide monomer mixture was 7.2:8.9 (w/w). The catalyst concentration of KOH was 0.2% and the heat exchange medium was at a temperature of 180° C. The product from the third spiral reaction tube was passed through a fourth spiral reaction tube wherein the heat exchange medium was at a temperature of 230° C. The product from the fourth spiral reaction tube was placed under high vacuum to remove unreacted alkylene oxide monomer. The product obtained had a hydroxyl number of 366, and an amine number of 94, and a viscosity of 4,000 centipoise at 80° F.

EXAMPLE 3

Example 3 was prepared similar to Example 1. The vicinal toluene diamine and ethylene oxide monomer mixture were injected into a first spiral reaction tube at a feed ration of 8.4:8.2 (w/w). The pressure at injection was 650 lbs. per square inch and the heat exchange medium was at a temperature of 140° C. The product from the first spiral reaction tube was passed through a second spiral reaction tube wherein the heat exchange medium was at a temperature of 200° C. The intermediate at this point had a hydroxyl number of 830 and an amine number of 297. The product from the second spiral reaction tube was injected with aqueous KOH solution (45%) and propylene oxide monomer mixture into a third spiral reaction tube. The feed ratio of intermediate to propylene oxide monomer mixture was 8.1:8.8 (w/w). The catalyst concentration of KOH was 0.2% and the heat exchange medium was at a temperature of 180° C. The reaction product from the third spiral reaction tube was passed into a fourth spiral reaction tube wherein the heat exchange medium was at a temperature of 230° C. The product from the fourth spiral reaction tube was placed under high vacuum to remove unreacted alkylene oxide monomer and the product obtained had a hydroxyl number of 421 and an amine number of 143.

EXAMPLE 4

Example 4 was prepared similar to Example 1. To the first spiral reaction tube vicinal toluene diamine, ethylene oxide monomer, and aqueous KOH catalyst solution (45%) were injected into the first spiral reaction tube. The feed ratio of vicinal toluene diamine to ethylene oxide monomer was 6.6:9.2 (w/w). The catalyst concentration of KOH was 0.4%. The pressure at injection was 840 lbs. per square inch and the heat exchange medium was at a temperature of 170° C. The product from the first spiral reaction tube was passed through a second spiral reaction tube wherein the heat exchange medium was at a temperature of 210° C. The intermediate at this point had a hydroxyl number of 750 and an amine number of 139. The product from the second spiral reaction tube was injected together with propylene oxide monomer mixture into a third spiral reaction tube. The feed ratio of intermediate to propylene oxide mixture was 8.7:8.9 (w/w). The heat exchange medium was at 180° C. The product from the third spiral reaction tube was passed into a fourth spiral reaction tube wherein the heat exchange medium was at a temperature of 230° C. The product from the fourth spiral reaction tube was placed under high vacuum to remove unreacted alkylene monomer and the product obtained had a hydroxyl number of 388 and an amine number of 69.

The present invention has been described in accordance with the relevant legal standards, thus the foregoing description is exemplary rather than limiting in nature. Variations and modifications to the disclosed embodiment may become apparent to those skilled in the art and do come within the scope of this invention. Accordingly, the scope of legal protection afforded this invention can only be determined by studying the following claims.

We claim:

1. A continuous process of forming polyether polyols comprising-the steps of:
    a) continuously forming an initial reaction mixture of at least one alkylene oxide and a self catalyzing initiator having at least one reactive hydrogen which is reactive to said alkylene oxide in the absence of a catalyst;
    b) continuously flowing said initial reaction mixture through a first spiral shaped reaction tube having an internal diameter and a spiral diameter that promote a pseudo-turbulent flow of said initial reaction mixture through said first spiral shaped reaction tube to form a reaction product;
    c) flowing said reaction product into a second spiral shaped reaction tube operably connected to said first spiral shaped reaction tube and adding a catalyst and an alkylene oxide to said reaction product, said second spiral shaped reaction tube having an internal diameter and a spiral diameter that promote a pseudo-turbulent flow of said reaction product, said catalyst and said alkylene oxide in said second spiral shaped reaction tube; and
    d) continuously flowing a heat exchange medium around said first and said second spiral shaped reaction tubes, said heat exchange medium establishing and maintaining a reaction temperature between 130° C. and 250° C. in said first and said second spiral shaped reaction tubes.

2. A continuous process as recited in claim 1 wherein, step c) comprises adding one of potassium hydroxide, sodium hydroxide, an alcoholate of potassium hydroxide, an alcoholate of sodium hydroxide, cesium hydroxide, an amine, a Lewis acid catalyst, or a metal complex catalyst as said catalyst.

3. A continuous process as recited in claim 1 wherein, step a) comprises adding an aromatic compound having at least one reactive hydrogen which is reactive to said alkylene oxide as said initiator.

4. A continuous process as recited in claim 1 comprising the further step of maintaining a pressure in said first and said second spiral shaped reaction tubes that is above the vapor pressure of said alkylene oxides and that maintains said alkylene oxides in a liquid state in said first and said second spiral shaped reaction tubes.

5. A continuous process as recited in claim 1 wherein said method includes maintaining said reaction temperature between 180° C. and 250° C. with said heat exchange medium.

6. A continuous process of forming polyether polyols comprising the steps of:
   a) continuously forming an initial reaction mixture of ethylene oxide and a self catalyzing initiator in the absence of a catalyst, said initiator having at least one reactive hydrogen which is reactive to said ethylene oxide;
   b) continuously flowing said initial reaction mixture through a first spiral shaped reaction tube having an internal diameter and a spiral diameter that promote a pseudo-turbulent flow of said initial reaction mixture through said first spiral shaped reaction tube to form a reaction product;
   c) flowing said reaction product into a second spiral shaped reaction tube operably connected to said first spiral shaped reaction tube and adding a catalyst and an alkylene oxide to said reaction product, said second spiral shaped tube having an internal diameter and a spiral diameter that promote a pseudo-turbulent flow of said reaction product, said catalyst and said alkylene oxide in said second spiral shaped tube;
   d) surrounding said first and said second spiral shaped reaction tube with a heat exchange medium, said heat exchange medium establishing and maintaining a reaction temperature between 130° C. and 250° C. in said first and said second spiral shaped reaction tubes; and
   e) pressurizing said first and said second spiral shaped reaction tube at a pressure between 200 to 1500 pounds per square inch, thereby maintaining said ethylene oxide and said alkylene oxide in a liquid state.

7. A continuous process as recited in claim 6 wherein steps a) and b) are repeated a plurality of times until said ethylene oxide completely reacts with each of said reactive hydrogens prior to step c).

8. A continuous process as recited in claim 6 wherein step c) comprises adding one of potassium hydroxide, sodium hydroxide, an alcoholate of potassium hydroxide, an alcoholate of sodium hydroxide, cesium hydroxide, an amine, a Lewis acid catalyst, or a metal complex catalyst as said catalyst.

9. A continuous process as recited in claim 6 wherein step a) comprises adding toluene diamine as said initiator.

10. A continuous process as recited in claim 6 wherein said method includes maintaining said reaction temperature at a temperature between 160° C. to 210° C.

11. A continuous process as recited in claim 6 comprising the further steps of flowing an output from said second spiral shaped reaction tube through an additional spiral shaped reaction tube, said additional spiral shaped reaction tube surrounded with said heat exchange medium and at a pressure between 200 to 1500 pounds per square inch; and adding additional alkylene oxide to said additional spiral shaped reaction tube.

12. A continuous process as recited in claim 11 wherein the step of adding additional alkylene oxide to said additional spiral shaped reaction tube comprises adding propylene oxide to said additional spiral shaped reaction tube.

* * * * *